(12) United States Patent
Grasruck et al.

(10) Patent No.: US 8,005,287 B2
(45) Date of Patent: Aug. 23, 2011

(54) METHOD OF RECONSTRUCTING CT IMAGE DATA

(75) Inventors: Michael Grasruck, Erlangen (DE);
Karl Stierstorfer, Erlangen (DE);
Johan Sunnegårdh, Linköping (SE)

(73) Assignee: Siemens Aktiengesellschaft, Munich (DE)

( * ) Notice: Subject to any disclaimer, the term of this patent is extended or adjusted under 35 U.S.C. 154(b) by 235 days.

(21) Appl. No.: 12/457,972

(22) Filed: Jun. 26, 2009

(65) Prior Publication Data

US 2009/0324045 A1    Dec. 31, 2009

Related U.S. Application Data

(60) Provisional application No. 61/076,167, filed on Jun. 27, 2008.

(30) Foreign Application Priority Data

Oct. 24, 2008 (DE) .......................... 10 2008 053 110

(51) Int. Cl.
*G06K 9/00* (2006.01)
*A61B 6/00* (2006.01)
*A61B 5/05* (2006.01)

(52) U.S. Cl. ............................. 382/131; 378/4; 600/425

(58) Field of Classification Search .................. 382/128, 382/129, 130, 131, 132, 133, 134; 378/4, 378/21–27, 98.6, 98.9, 101, 901; 600/407, 600/410, 411, 425, 427; 424/9.4; 128/916, 128/920, 922
See application file for complete search history.

(56) References Cited

U.S. PATENT DOCUMENTS 5,848,114 A * 12/1998 Kawai et al. ...................... 378/4
6,148,057 A * 11/2000 Urchuk et al. ................... 378/18
7,409,033 B2 * 8/2008 Zhu et al. .......................... 378/4

FOREIGN PATENT DOCUMENTS

EP           1 612 734        1/2006

OTHER PUBLICATIONS

Germany Search Report dated Aug. 31, 2009 issued in corresponding Application No. DE 10 2008 053 110.
Sunnegårdh et al., "Regularized Iterative Weighted Filtered Backprojection for Helical Cone-Beam CT." Proc. Fully 3D Meeting and HPIR Workshop 2007, p. 237-240.

* cited by examiner

*Primary Examiner* — Abolfazl Tabatabai
(74) *Attorney, Agent, or Firm* — Harness, Dickey & Pierce, P.L.C.

(57) ABSTRACT

A method is disclosed for reconstructing CT image data. In at least one embodiment, the method includes providing measured CT projection data p based on the CT projection data p, reconstructing first CT image data $f_{k=1}$, and on the basis of the first image data $f_{k=1}$ iteratively generating k+1-th CT-image data according to the formula:

$$f_{k+1} = f_k - \alpha(Q(Pf_k - p) + \beta R(f_k))$$

until the standard $\|f_{k+1} - f_k\|_2$ is $\leq n$, with the reconstruction operator Q containing a noise weighting according to $Q = B \cdot W_{statist} \cdot H$. Aside from suppressing "cone" artifacts, the proposed method of at least one embodiment indicates a significant reduction in the image noise even after a few iterations.

17 Claims, 1 Drawing Sheet

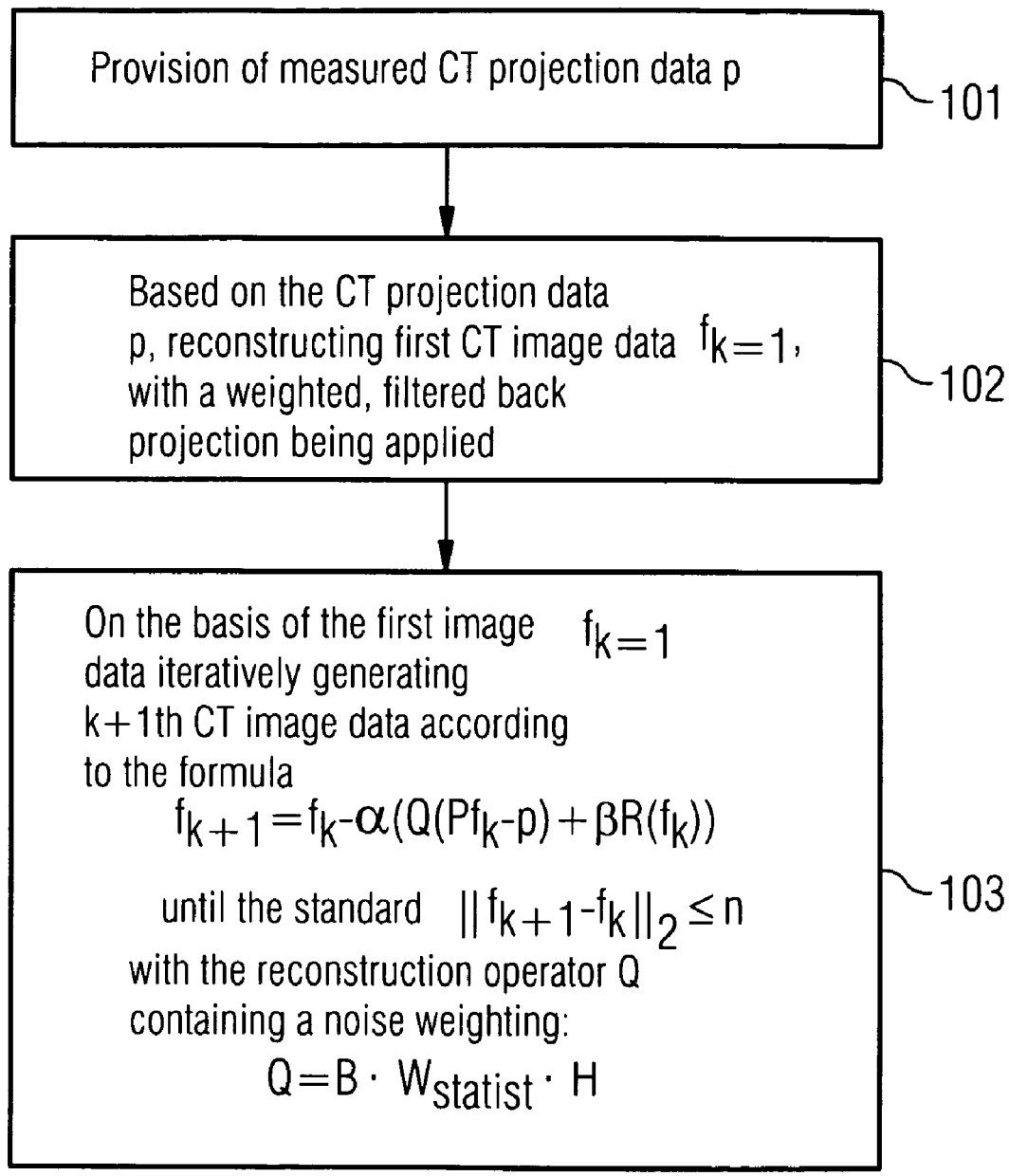

METHOD OF RECONSTRUCTING CT IMAGE DATA

PRIORITY STATEMENT

The present application hereby claims priority under 35 U.S.C. §119 on German patent application number DE 10 2008 053 110.3 filed Oct. 24, 2008 and the present application hereby claims priority under 35 U.S.C. §119(e) on U.S. provisional application No. 61/076,167 filed Jun. 27, 2008, the entire contents of each of which is hereby incorporated herein by reference.

FIELD

At least one embodiment of the present invention generally applies to the field of medical technology and generally describes a method of reconstructing CT image data.

BACKGROUND

The weighted filtered back projection (WFBP) is nowadays typically used within the prior art for reconstructing computed tomography image data (CT image data). The majority of computed tomograph (CT) manufacturers use this algorithm in different forms. These established algorithms are reliable and provide an acceptable image quality with minimal computing time.

This is disadvantageous in that the (weighted) filtered back projection algorithms cannot be precisely solved mathematically for multi-row systems so that so-called "cone" artifacts result, in particular in the case of large cone angles, as a result of approximations used in the algorithms. It is also disadvantageous that all beams with the same weight are included in the reconstructed image; i.e. although individual x-ray beams, when scanning an examination object, have a significantly poorer signal-to-noise ratio as a result of different attenuation of the x-ray beams in the examination object, this is not taken into consideration in the reconstruction. Filtered back projections are also inflexible in respect of the geometric reproduction of the scanning process. The spatial actual extension of the x-ray focus and of the detector elements as well as the gantry rotation of the CT used for obtaining CT projection data result in blurred CT projection data. The known filtered back projection algorithms do not allow this blurring to be corrected.

All in all, filtered back projections are nowadays no longer adequate for some applications in respect of the thus achievable spatial resolution, the image noise and therefore finally the image quality.

Statistical reconstruction methods are known as an alternative to the weighted filtered back projection methods. These iterative methods are able to reduce "cone" artifacts and/or to take information from previously reconstructed CT image data into consideration. The different statistical benefits of the individual measuring beams with a different weighting can also be taken into consideration in these methods, i.e. they take the actual distribution of the noise in the CT projection data into consideration. In comparison with the filtered back projection method, these statistical iterative methods allow the generation of CT image data with a higher contrast, a higher spatial resolution, a lower number of artifacts and a better signal-to-noise ratio. The main disadvantage lies however in the considerably higher computing time (by a factor of approximately 100) of these methods compared with a filtered back projection.

SUMMARY

In at least one embodiment of the present invention, a method is disclosed for reconstructing CT image data, which reduces the previously specified disadvantages of the prior art, and in particular requires less computing time by comparison with the known iterative, statistical methods.

The method according to at least one embodiment of the invention includes the following steps:

1.1. Providing measured CT projection data p,
1.2. based on the CT projection data p reconstructing first image data $f_{k=1}$,
1.3. on the basis of the first CT image data $f_{k=1}$ iteratively generating k+1-th CT image data according to the formula:

$$f_{k+1} = f_k - \alpha(Q(Pf_k - p) + \beta R(f_k))$$

as long as the standard $\|f_{k+1} - f_k\|_2$ is $\leq n$, with $f_k$ representing the CT image data after the k'th iteration,
Q representing a reconstruction operator,
P representing a reprojection operator,
$\alpha, \beta$ representing constants,
$R(f_k)$ representing a regularization operator, and
n representing a predefinable constant, with the reconstruction operator Q containing a noise weighting:

$Q = B \cdot W_{statist.} \cdot H$, with

B back projection operator,
$W_{statist.}$ weighting operator, and
H ramp filter.

The proposed algorithm combines the advantages of the filtered back projection and the afore-cited statistical methods with one another. The statistical weighting comprising the statistical, iterative methods is integrated into an iterative reconstruction, the innermost loop of which is a filtered back projection. This ensures that the noise is reduced by way of a statistical weighting of the measuring beams, without the computing time increasing by orders of magnitude.

The provision of CT projection data p which is typically recorded in the fan beam geometry takes place in step 1.1. Projection data preferably exists after a rebinning of the recorded projection data in the parallel geometry. Both 2D and also 3D data are considered as projection data.

A reconstruction of first CT image data $f_{k=1}$ takes place in step 1.2. based on the CT projection data p provided. A filtered back projection, in particular a weighted, filtered back projection, is used particularly advantageously in this reconstruction.

An iterative calculation of image data $f_{k+1}$ from image data $f_k$ takes place in step 1.3 in accordance with the following recursion formula:

$$f_{k+1} = f_k - \alpha(Q(Pf_k - p) + \beta R(f_k)) \tag{1}$$

as long as the standard $\|f_{k+1} - f_k\|_2$ is $\leq n$, with the iteration beginning with the first image data $f_{k=1}$. The values n and/or the value k can be selected accordingly depending on the application. The values $\alpha$ and $\beta$ are freely selectable constants, which control the increment of the update step ($\alpha$) and/or the influence of the regularization ($\beta$). The regularization operator $R(f_k)$ is generally a non-linear, locally active function. In a particularly preferred embodiment of the method, the regularization operator $R(f_k)$ corresponds to the following formula:

$$R(f) = \sum_{i=1}^{N}\left(\sum_{j=1}^{N} d_{ij}\frac{dS_i}{df}(f_i - f_j)\right)e_i, \quad (2)$$

with $e_i$ being an image pixel base vector, $d_{ij}$ being scalars and $S_i(f)$ being a potential function. A particularly good noise suppression and a high spatial contrast resolution are enabled for instance by the following potential function $S_i(f)$:

$$S(f) = \frac{|f^p|}{\left(1 + \left|\frac{f}{c}\right|^{p-q}\right)}. \quad (3)$$

To select the parameters c, p, q, see Article by J-B. Thilbault et al., "A three-dimensional statistical approach to improved image quality for multislice helical CT", in Med. Phys. Vol. 34, No. 11, November 2007, pages 4526-4544, Am. Assoc. Phys. Med., the entire contents of which are hereby incorporated herein by reference.

In accordance with at least one embodiment of the invention, contrary to previously known iteration methods, the formula (1) contains a noise weighting in the reconstruction operator Q. The weighting is inserted after the convolution and prior to the back projection. The reconstruction operator Q can thus be written as $$Q = B * W_{statist.} * H. \quad (4)$$

B corresponds here to the back projection operator, $W_{statist.}$ corresponds to a weighting matrix and H corresponds to a ramp filter. The weighting matrix is preferably selected such that it mirrors the statistics of the measured CT projection data, for instance 1/measuring noise or exponentially for weakening the x-ray beams.

As a result of the weighting $W_{statist.}$ during the reconstruction Q, the beams with a higher statistical weight enter each pixel value of the CT image data with more intensity. In clear terms, when updating a pixel, the increment is controlled as a function of how many beams with a high statistical weight, i.e. "good" statistics, contribute to this pixel.

With the proposed introduction of a weighting into the iteratively filtered back projection, it is possible to transmit the noise suppression known from the statistical reconstruction also to the filtered back projection which saves considerably on computing time. Aside from suppressing the "cone" artifacts, the proposed method indicates a significant reduction in the image noise even after a few iterations (20-30 iterations).

By comparison with a known, weighted filtered back projection, this additional effort is thus higher by a factor, which corresponds approximately to the number of iterations i.e. factor 20-30. This increase in computing time nevertheless lies far below the currently conventional values for a classical statistically iterative reconstruction method (factor 100 and more).

BRIEF DESCRIPTION OF THE DRAWINGS

Further details and advantages are described below with reference to example embodiments shown in the drawings, in which:

FIG. 1 shows a schematic cycle of an inventive method for reconstructing CT image data.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows a schematic cycle of an inventive method for reconstructing CT image data comprising three steps 101-103. The method is based on an examination object being firstly scanned in a spiral fashion by way of a CT device for instance. The scanning typically takes place in a cone or fan-shaped scanning geometry. The CT projection data p generated in this way is now provided in step 101 after a rebinning step upstream thereof in parallel geometry. Based on the CT projection data p provided, the reconstruction of first CT image data $f_{k=1}$ takes place in step 102, with a weighted filtered back projection being used. Algorithms of this type are known in the prior art, so that reference is made to this point. On the basis of the first image data $f_{k=1}$, an iterative generation of k+1-th CT image data takes place in step 103 in accordance with the formula:

$$f_{k+1}=f_k-\alpha(Q(Pf_k-p)+\beta R(f_k))$$

until the standard $$\|f_{k+1}-f_k\|_2 \text{ is } \leq n,$$

with the reconstruction operator Q containing a noise weighting:

$$Q=B\cdot W_{statist.}\cdot H.$$

As a result of the weighting $W_{statist.}$ during the reconstruction Q, the beams with a higher statistical weight are included in each pixel value of the CT image data with greater intensity.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combineable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for reconstructing CT image data, comprising:
providing measured CT projection data p;

reconstructing first CT image data $f_{k=1}$ based on the provided CT projection data p; and iteratively generating, on the basis of the reconstructed first CT image data $f_{k=1}$, k+1-th CT image data according to the formula:

$$f_{k+1} = f_k - \alpha(Q(Pf_k - p) + \beta R(f_k))$$

provided the standard $\|f_{k+1} - f_k\|_2$ is $\leq n$ with $f_k$ representing the CT image data after the k'th iteration,
Q representing a reconstruction operator,
P representing a reprojection operator,
$\alpha, \beta$ representing constants,
$R(f_k)$ representing a regularization operator, and
n representing a predefinable constant, with the reconstruction operator Q containing a noise weighting:

$$Q = B \cdot W_{statist.} \cdot H, \text{ with}$$

B back projection operator,
$W_{statist.}$ weighting operator, and
H ramp filter.

2. The method as claimed in claim 1, wherein the weighting operator $W_{statist.}$ is selected such that it corresponds to the statistics of the measured CT projection data provided.

3. The method as claimed in claim 2, wherein the reconstruction of the CT projection data takes place as filtered back projection.

4. The method as claimed in claim 3, wherein an examination object is scanned using a CT device to derive the measured CT projection data p.

5. The method as claimed in claim 4, wherein the examination object is scanned in a spiral fashion by way of the CT device.

6. The method as claimed in claim 5, wherein scanning takes place in a cone or fan-shaped scanning geometry.

7. The method as claimed in claim 2, wherein an examination object is scanned using a CT device to derive the measured CT projection data p.

8. The method as claimed in claim 7, wherein the examination object is scanned in a spiral fashion by way of the CT device.

9. The method as claimed in claim 8, wherein scanning takes place in a cone or fan-shaped scanning geometry.

10. The method as claimed in claim 1, wherein the reconstruction of the CT projection data takes place as filtered back projection.

11. The method as claimed in claim 10, wherein an examination object is scanned using a CT device to derive the measured CT projection data p.

12. The method as claimed in claim 11, wherein the examination object is scanned in a spiral fashion by way of the CT device.

13. The method as claimed in claim 12, wherein scanning takes place in a cone or fan-shaped scanning geometry.

14. The method as claimed in claim 1, wherein an examination object is scanned using a CT device to derive the measured CT projection data p.

15. The method as claimed in claim 14, wherein the examination object is scanned in a spiral fashion by way of the CT device.

16. The method as claimed in claim 15, wherein scanning takes place in a cone or fan-shaped scanning geometry.

17. A computer readable medium including program segments for, when executed on a computer device, causing the computer device to implement the method of claim 1.

* * * * *